(12) United States Patent
Griffin

(10) Patent No.: US 6,412,402 B1
(45) Date of Patent: Jul. 2, 2002

(54) EDGE MAKING BAKING PAN

(76) Inventor: Matthew L. Griffin, 3050 Kirklevington Apt. #111, Lexington, KY (US) 40517

( * ) Notice: Subject to any disclaimer, the term of this patent is extended or adjusted under 35 U.S.C. 154(b) by 0 days.

(21) Appl. No.: 09/685,636

(22) Filed: Oct. 10, 2000

Related U.S. Application Data

(60) Provisional application No. 60/158,770, filed on Oct. 12, 1999.

(51) Int. Cl.[7] .............................. A21B 3/13; A21B 5/02
(52) U.S. Cl. ...................... 99/432; 99/426; 99/DIG. 15
(58) Field of Search ....................... 99/430, 432, 426, 99/DIG. 15; 249/DIG. 1

(56) References Cited

U.S. PATENT DOCUMENTS

| | | | | | |
|---|---|---|---|---|---|
| 883,296 | A | * | 3/1908 | Cook | 99/DIG. 15 |
| 2,231,223 | A | * | 2/1941 | Page | 99/DIG. 15 |
| 4,052,034 | A | * | 10/1977 | Marceno | 249/DIG. 1 X |
| 4,452,419 | A | * | 6/1984 | Saleeba | 249/DIG. 1 X |
| 6,176,465 | B1 | * | 1/2001 | Cooper et al. | 99/426 X |

* cited by examiner

Primary Examiner—Reginald L. Alexander

(57) ABSTRACT

A baking pan that has crests (10) which act as additional pan edges for the baked good to bake against and near, thereby providing a baked good that has a substantial increase in its edge linear measure.

1 Claim, 2 Drawing Sheets

EDGE MAKING BAKING PAN

CROSS-REFERENCE TO RELATED APPLICATIONS

This application is entitled to the benefit of Provisional Patent Application Ser. No. 60/158,770 filed Oct. 12, 1999.

BACKGROUND

1. Field of Invention

This invention relates to kitchenware, specifically to a baking pan that adds more edges and corners to the baked good.

2. Discussion of Prior Art

When brownies, cakes, and other goods are baked, the edges (those parts touching the sides of the baking pan) have a different consistency than those that do not touch the pan sides. The portions of baked goods that touch the pan sides have a chewier, firmer edge than those portions that are not near baking pan sides. Some people prefer the portions of the baked good that have an edge that was baked touching the side of the baking pan (especially corner portions of baked goods, since they have two (2) edges that were baked touching the pan sides).

Existing baking pans that are used to bake cakes, brownies and other goods are rectangular or round in shape. Pans with specific shapes (for example, those in the design of cartoon characters) are shaped for aesthetic purposes only. These pans do not change the end product, except in shape. They do not create substantially more edge per total amount of baked good.

SUMMARY

This invention is an article of kitchenware for increasing the edge linear measure of the goods baked within said article comprising
  (a) a baking pan of predetermined material said baking pan having a baking surface said baking surface having raised crests that are substantially tall enough to peak over baked good batter surface.

Whereby increasing the number of edges of the goods baked within the pan.

OBJECTS AND ADVANTAGES

Accordingly, the advantage of the present invention is:
  (a) The baking pan has more edges for the baked good to be baked against. Baking with this pan will create more edges on the baked good compared to baking with a standard rectangular, circular, or aesthetically shaped pan.

A further advantage is that baking with this pan will decrease the time needed to cook the baked good. Areas of a baked good batter that are near or touching the edge of any baking pan while baking, bake faster than those areas of the batter that are not touching or near an edge. Since this pan has more edges, the baked good will bake faster.

DRAWING FIGURES

In the drawings, closely related figures have the same number but different alphabetic suffixes.

REFERENCE NUMERAL IN DRAWINGS

10 Crest

DESCRIPTION OF INVENTION

Figure 1:
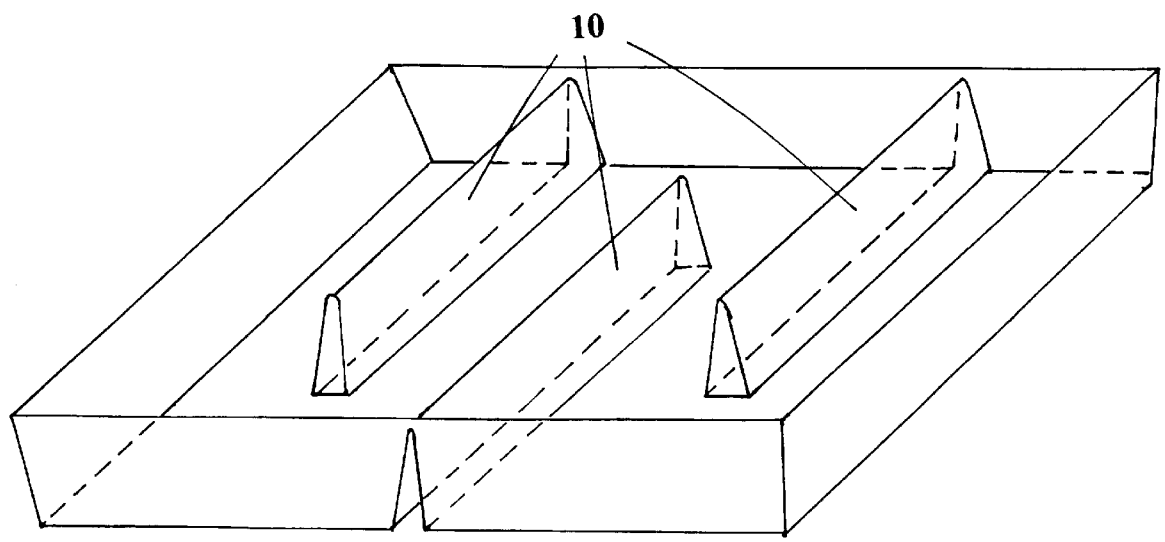
FIG. 1 shows a perspective view of the Edge Making Baking Pan.
Figure 2A:
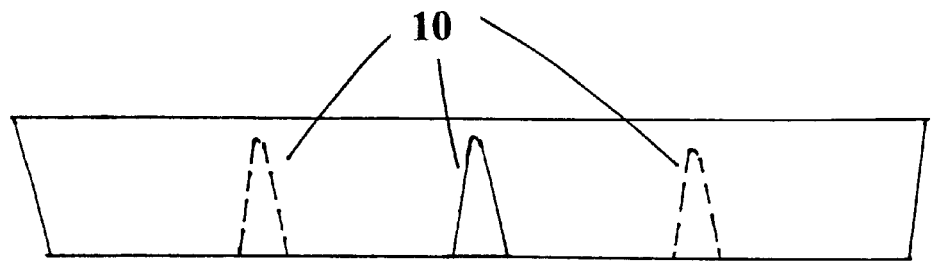
FIGS. 2A and 2B show elevation views of the Edge Making Baking Pan.
Figure 2B:
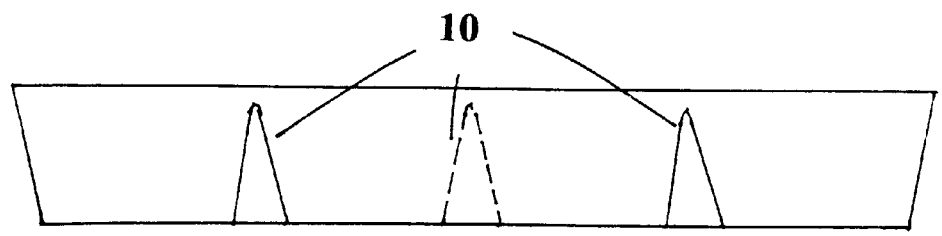
Figure 3:
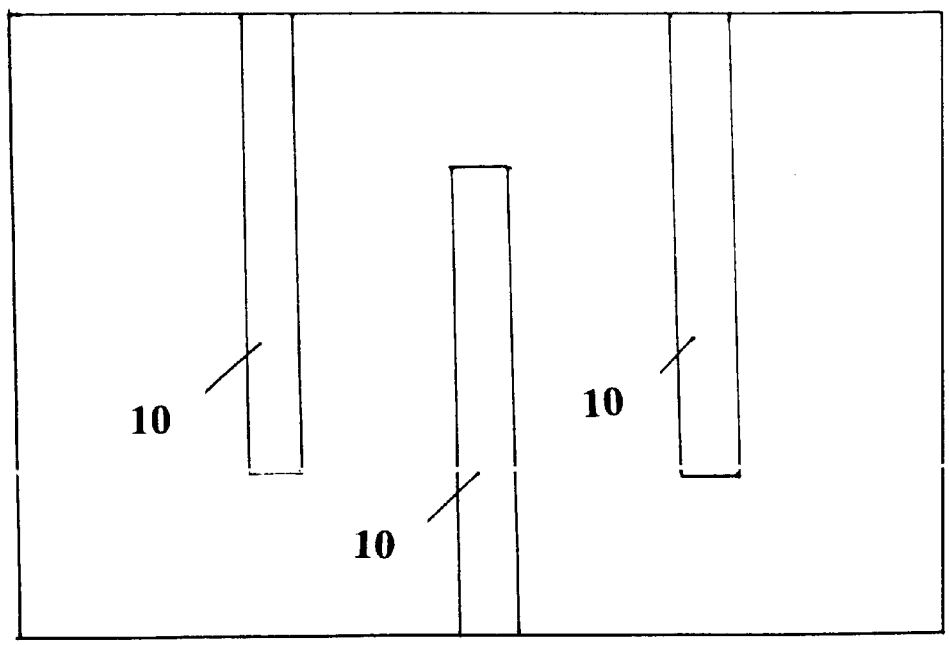
FIG. 3 shows a plan view of the Edge Making Baking Pan.

A preferred embodiment of the Edge Making Baking Pan is illustrated in FIG. 1 (perspective view), FIGS. 2A and 2B (elevation views), and FIG. 3 (plan view). It is an aluminum pan with the same metal thickness as existing pans that are used to bake brownies or other baked goods. It measures 9 inches in width, 13 inches in length, and 2 inches in depth. The baking pan has three raised undulations, humps, or crests 10 (FIG. 1). Crests are raised areas on the baking surface of the pan. A crest extends from the bottom surface of the baking pan to a height of 2 inches (equal the depth of the pan). The base of the crest (located at the bottom of the baking pan) is 1 inch in width, the top of the crest is 0.5 inches in width. The crest has a rounded top. A crest is six inches in length, running parallel to the 9-inch sides of the pan. Each crest has an end that extends to one 13-inch side of the baking pan and an end that stops three inches from the opposite side of the baking pan. Two crests extend to one 13-inch side, each located on tangents that are 3.25 inches away from opposite 9-inch pan sides. One crest extends to the other 13-inch pan side, and is located 6.5 inches away from either 9-inch pan side (midpoint of a 13-inch side).

Operation of Invention

The Edge Making Baking Pan is operated like any other baking pan. A batter of a specified baked good is poured into the pan and the pan is placed into an oven. The crests 10, shown in FIG. 1 add more edges to the good baked within by acting as additional baking sides for the batter to bake against and near. The crests stand higher than the batter depth, and thus increase the perimeter measure of the good baked within. An increase in perimeter measure means that there is an increase of baked good edge.

Conclusion, Ramifications, and Scope of Invention

Thus the reader will see that the Edge Making Baking Pan creates more edges on the goods that are baked within.

While my above description contains many specificities, these should not be construed as limitations on the scope of the invention, but rather as an exemplification of one preferred embodiment thereof. Many other variations are possible.

For example, the pan can have:
different dimensions such as 8"×8"×3", 9"×9"×2" etc.;
the crests can have different dimensions such as 5"×1"× 3", 4"×2"×2.5" etc.;
the number of crests can be different such as 4 crests, 1 crest, 2 crests, etc.;
the crest locations can be changed such as locating all crests on one side at specified intervals, locating one crest 4-inches from an end and 2 crests on the opposite side 1-inch from each end, etc.;
overall pan shape can be changed such as circular, shaped like a rabbit, square, etc.;
crest shape can be changed such as they are curved lengthwise, base is not wider than top, etc.;
pan can be made of different material such as glass, copper, stoneware, etc.;
pan material can have different thickness such as 1 mm, 0.12 mm, etc.

Accordingly, the scope of the invention should be determined not by the embodiment(s) illustrated, but by the appended claims and their legal equivalents.

I claim:

1. A kitchenware baking pan for increasing the edge linear measure of the goods baked within said article comprising a one piece baking pan of predetermined material said baking pan having side walls and a baking surface enclosed by said side walls, said baking surface being comprised of a single baking cavity said baking surface of said cavity having raised crests that are substantially tall enough to peak over baked good batter surface, said raised crests extending from one side wall in a direction toward an opposed side wall but not making contact with said opposed side wall whereby increasing the number of edges of the goods baked within the pan.

* * * * *